United States Patent [19]
Bebart

[11] 3,867,117
[45] Feb. 18, 1975

[54] METHOD AND APPARATUS FOR FORMING GLASS FIBERS AND MARBLE DELIVERY MEANS THEREFOR

[75] Inventor: James A. Bebart, Newark, Ohio
[73] Assignee: Owens-Corning Fiberglas Corporation, Toledo, Ohio
[22] Filed: Jan. 4, 1974
[21] Appl. No.: 430,845

Related U.S. Application Data
[63] Continuation-in-part of Ser. No. 274,781, July 24, 1972, abandoned.

[52] U.S. Cl. ............ 65/2, 65/11 R, 65/11 W, 65/374, 222/527
[51] Int. Cl. ............................................. C03b 37/02
[58] Field of Search......... 65/1, 2, 11 R, 11 W, 335, 65/374; 222/527

[56] References Cited
UNITED STATES PATENTS
3,129,084  4/1964  Cabino ..................................... 65/2
3,134,659  5/1964  Cabino ..................................... 65/2
3,479,167  11/1969  Ashman ........................ 65/11 W X Primary Examiner—Robert L. Lindsay, Jr.
Attorney, Agent, or Firm—Carl G. Staelin; John W. Overman; Ralph J. Skinkiss

[57] ABSTRACT

The disclosure describes method and apparatus for conveying glass marbles from a central supply hopper to a marble melting unit. Said apparatus comprises a continuous spring conduit containing therein a head of marbles which cause induced vibrational modes to be transmitted throughout the conduit thereby preventing marble jams therein. Further the apparatus provides a flexible conduit which is easily routed around obstacles forming a continuous uninterrupted tubular path of uniform diameter from supply hopper to the melter.

2 Claims, 4 Drawing Figures

PATENTED FEB 18 1975 3,867,117

METHOD AND APPARATUS FOR FORMING GLASS FIBERS AND MARBLE DELIVERY MEANS THEREFOR

RELATED APPLICATIONS

This is a continuation in part application of my copending application, Ser. No. 274,781, filed July 24, 1972 now abandoned.

BACKGROUND OF THE INVENTION

This invention relates to a method and apparatus for conveying glass marbles by gravity feed from a marble supply hopper to a marble melting unit from which glass fibers are drawn.

The process of producing glass fibers involves flowing streams of molten glass from orifices in an electrically heated metal feeder or bushing. The molten glass flows through the orifices and is emitted as streams of glass which may be attenuated into fibers by a variety of means. One particular fiber forming process known as the marble melt process involves supplying preformed spherically shaped bodies of glass or marbles to a feeder for melting and conditioning of the glass. Typically, the required marbles are conveyed by the force of gravity from a central supply source or hopper to individual stream feeders. The conduit or chute through which the marbles are delivered has conventionally been made from four or more rigid preformed parallel rods spaced from each other around the circumference of a circle somewhat greater in diameter than the diameter of the marbles and arranged to retain the marbles in the chute. The rods thus form a long longitudinal cage or chute which is partially open along its length to allow the operator access to the inside of the chute to dislodge marbles which may become stuck therein. In the past, each fiber forming position has had its own customized marble chute because of the particular equipment such as transformers which the chute must circumvent to create a continuous path from hopper to feeder.

These parallel bar chutes have been used successfully for many years. However, they still suffer from several disadvantages. They are relatively expensive because of the wide variety and the customizing needed for the many different types of fiber-forming positions. Such chutes are difficult to install because they are generally installed in confined quarters and their rigidity is not conductive to such work. Also the parallel rods may be easily dented, and are usually difficult to satisfactorily straighten. Once the rods are dented, the marbles are apt to jam in the chute thus interrupting the necessary glass supply to the feeder. Further such chutes do not freely convey commonly found marble deformities such as elliptically shaped marbles. Particularly troublesome are fractured marbles or marble chips as they readily jam because of having a flat or planar surface which prevents their rolling through the chute.

SUMMARY OF THE INVENTION

Accordingly it is an object of this invention to provide a dynamic marble conduit system having an inherent design feature that prevents marble jamming.

Also it is an object of the invention to provide a marble conveying means which is inexpensive to manufacture, and easy to install.

DESCRIPTION OF THE PREFERRED EMBODIMENT

In describing the invention, particular stress is placed on the marble melt process of forming continuous glass fibers but it will be apparent as the description proceeds that the invention is applicable to any fiber forming process in which thermoplastic or other heat softenable material is supplied to the melter means in the form of marbles.

Figure 1:
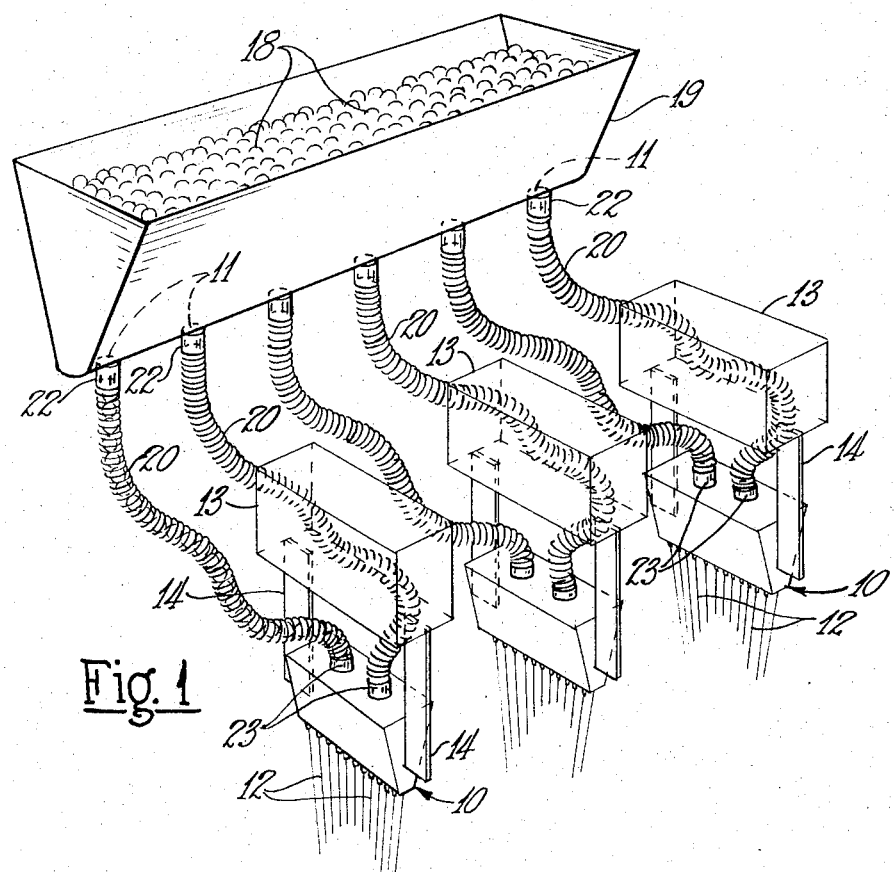
FIG. 1 is a diagrammatic view of fiber producing apparatus embodying the marble chute of this invention.

With the above in view, reference is made to FIG. 1 of the drawing wherein the numeral 10 indicates melting chambers or feeders adapted to contain a supply of molten glass. Fibers 12 are formed from the glass by conventional means (not shown). Typically, each feeder has a multiplicity of orifices in its bottom wall through which molten glass flows in the form of streams. The streams are attenuated to form filaments and the latter are gathered by any suitable means to form a strand. The strand may be wound about a collecting drum suitably supported for rotation or it may be collected on a conveyor to form a mat. The feeder 10 is generally connected in series with an electrical heating circuit having means for controlling current and thereby regulating the temperature of the feeder. This temperature will vary depending upon the heat softenable material being used, but in any case, is sufficient to melt the material to the proper viscosity for flow through the orifices by the action of gravity.

Figure 3:
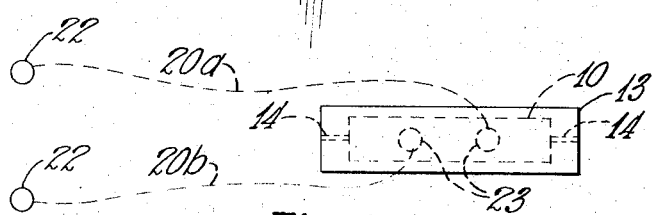
FIG. 3 is a plan view of the apparatus shown in FIG. 2.
Figure 2:
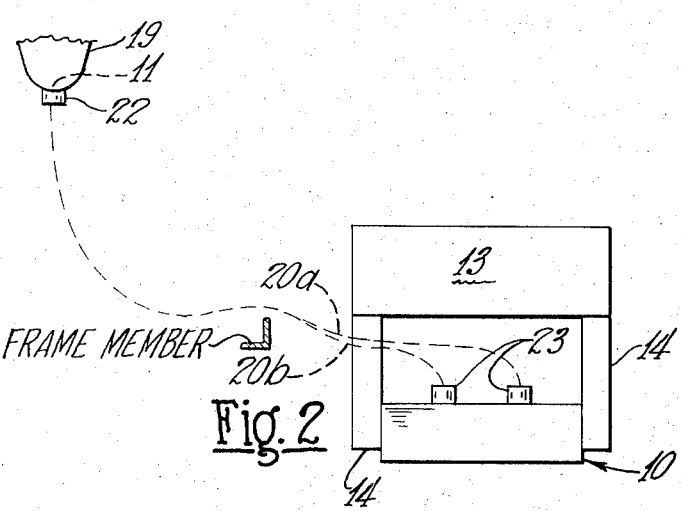
FIG. 2 is a side elevational view of a portion of the apparatus shown in FIG. 1, indicating the tortuous path of the chute by dotted lines.
Figure 4:
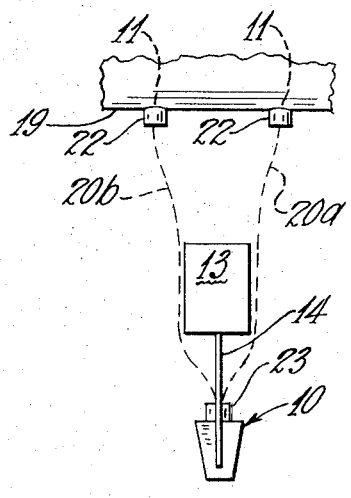
FIG. 4 is an end elevational view thereof.

The heat softenable material is fed into the top of each feeder 10 in the form of marbles 18. The marbles are supplied from a central hopper 19 and are discharged by appropriate means on flow by gravity from openings 11 in the bottom of the hopper into the upper or receiving end 22 of the chutes 20. In the present instance, each chute 20 is formed of a series of adjacent helical turns of resilient wire. It has been found that for feeding 1-inch diameter glass marbles, commercially available steel springs made of coils of No. 12 wire are satisfactory. It is necessary that the coil be sufficiently rigid to prevent excessive sagging when filled with the marbles. Also the internal diameter of the tube formed by the coils must be somewhat greater than the diameter of the marbles. In addition the individual loops of the coil must be close enough together to retain the marbles in the chute. A spacing about ⅛ inch is satisfactory for the 1-inch marbles. From the receiving end 22, each chute follows a tortuous path downwardly from the hopper around other auxiliary equipment 13 to where the delivery end 23 of each chute connects to the top of each feeder 10. FIGS. 2, 3, and 4 are included to indicate the tortuous path followed by the chutes. The path of each chute is indicated in FIGS. 2, 3 and 4 by the dotted lines 20a and 20b. The glass marbles previously admitted to each feeder 10 are supported on the surface of the molten glass and as the lowermost marbles melt, the marbles of the column directly above each feeder descend by gravity into the feeder so that the operation of each feeder is continuous.

The form of the invention shown provides a non-clogging flexible continuous spring conduit that when a full head of marbles is maintained therein and intermittently dispensed from the exit end vibrational modes are induced throughout the length of the spring conduit because of the tumbling movement of the marbles over a series of adjacent convolutions. Aiding the transmission of these induced vibrations is the torisional loaded resilient wire from which the spring conduit is made. The natural weight of the head of marbles spring loads the resilient wire. The induced vibrations are created when the marbles move intermittently through the chute, thereby individually agitating the moving marbles and preventing marble jams resulting from frictional binding between marbles and chute. The individual agitating is so effective at urging the marble flow through the chute to the melter that imperfectly shaped marbles, such as elliptical marbles, half marbles or marble chips are agitatingly urged through the spring conduit without jamming.

A further benefit of my spring conduit marble chute is easier installation and greater reliability than prior conveying means. Because the coiled wire or spring chute is flexible, it is relatively simple to route the chute around the transformers 13, busbars 14, or other equipment necessary for glass fiber forming to provide a continuous path from the hopper to the melter. Further because of the head of marbles continuously present in the chute and the vibrational agitation of the marbles along the length of the chute I have found that my spring conduit chute can be routed up a slight grade as shown in FIG. 2 without disruption of the marble flow.

For some applications where the coil chute may contact electrical conductors, a sleeve made of non-conducting material such as glass or asbestos may be placed over the coil. This sleeve sets to insulate the metal coil from contact with the busbars or other other electric current carriers. For the same reason of electrical insulation, the coil chute or the members which it may contact may be given a permanent insulating cover by flame spraying it with a non-conducting ceramic oxide on the areas subject to contact.

It is apparent that, within the scope of the invention, modifications and different arrangements may be made other than those disclosed herein, and the present disclosure is illustrative merely, the invention comprehending all variations thereof.

I claim:

1. An improved flexible marble chute for providing a contiguous intermittent supply of glass marbles from an elevated supply hopper to a lower elevation glass melting unit wherein the improvement comprises a flexible continuous coil of adjacent convolutions of resilient wire covered with an electrically non conductive material, said coil forming an elongated spring conduit having an inside diameter slightly greater than that of the diameter of marbles conveyed therein, said conduit containing a full head of marbles extending from said supply hopper to said melting chamber and forming a continuous path wherein substantial lengths of said spring conduit have steeply sloped vertical drop sections, means for intermittently dispensing marbles from said spring conduit into said melting chamber thereby causing a corresponding intermittent flow of marbles through the conduit, said spring conduit having a spring constant such that the vertical drop sections are spring loaded under the weight of said marbles contained therein to the extent that induced torsional stresses within the resilient wire promote transmission of vibrations therethrough, said vibrations being caused by the intermittent and tumbling movement of the marbles through the spring conduit and over said adjacent convolutions agitating the marbles therein preventing marble jams.

2. A method of preventing marble jamming in a flexible convoluted curvilinear configured spring conduit conveying glass marbles from an elevated supply hopper to a lower elevation glass melting chamber comprising the steps of:
   a. providing a continuous flexible convoluted curvelinear configured spring conduit form said elevated supply hopper to the glass melting chamber having a substantial portion thereof extending down steeply sloped vertical drop sections,
   b. feeding glass marbles into said spring conduit at the hopper end totally filling said spring conduit and thereby causing said steeply sloped sections to be spring loaded to the extent that the increased spacing between convolutions is small with respect to the diameter of the marbles contained therein,
   c. intermittently dispensing glass marbles into the melting chamber thereby inducing random vibrational modes throughout the spring conduit agitating the marbles therein preventing marble jams,
   d. resupplying glass marbles at the hopper end of said conduit thereby maintaining a full head of marbles throughout the total length of the spring conduit.

* * * * *